(12) United States Patent
Leman (10) Patent No.: US 12,015,367 B2
(45) Date of Patent: Jun. 18, 2024

(54) ONE COIL MOTOR DRIVER WITH LINEAR CONTROL

(71) Applicant: Melexis Bulgaria EOOD, Sofia (BG)

(72) Inventor: Dirk Leman, Tessenderlo (BE)

(73) Assignee: MELEXIS BULGARIA EOOD, Sofia (BG)

( * ) Notice: Subject to any disclaimer, the term of this patent is extended or adjusted under 35 U.S.C. 154(b) by 9 days.

(21) Appl. No.: 17/741,628

(22) Filed: May 11, 2022

(65) Prior Publication Data

US 2022/0368251 A1   Nov. 17, 2022

(30) Foreign Application Priority Data

May 12, 2021   (EP) .................................... 21472002

(51) Int. Cl.
*H02P 6/26* (2016.01)
*H02P 6/08* (2016.01)
*H02P 6/17* (2016.01)
*H02P 29/024* (2016.01)
*H02P 29/68* (2016.01)

(52) U.S. Cl.
CPC .............. *H02P 6/085* (2013.01); *H02P 6/17* (2016.02); *H02P 6/26* (2016.02); *H02P 29/027* (2013.01); *H02P 29/68* (2016.02)

(58) Field of Classification Search
CPC .......... H02P 29/032; H02P 6/26; H02P 6/085; H02P 6/08; H02P 6/17; H02P 29/027; H02P 29/68
See application file for complete search history.

(56) References Cited

U.S. PATENT DOCUMENTS

| | | | | |
|---|---|---|---|---|
| 6,563,284 B2 * | 5/2003 | Teutsch | ................... | H02P 6/085 318/599 |
| 6,977,478 B2 * | 12/2005 | Biamonte | ............... | H02P 25/04 318/818 |
| 7,336,045 B2 * | 2/2008 | Clermonts | ................ | H02P 6/06 318/400.29 |
| 8,643,317 B2 * | 2/2014 | Chen | ......................... | H02P 6/30 318/400.26 |
| 8,723,463 B2 * | 5/2014 | Lin | ......................... | H02P 6/15 318/400.14 |
| 2007/0029958 A1 * | 2/2007 | Clermonts | ................ | H02P 6/06 318/432 |

(Continued)

FOREIGN PATENT DOCUMENTS

EP      1627463 B1    9/2008

OTHER PUBLICATIONS

Extended European Search Report from corresponding European Application No. 21472002.1, Nov. 3, 2021.

*Primary Examiner* — Thai T Dinh
(74) *Attorney, Agent, or Firm* — Workman Nydegger (57) ABSTRACT

A motor driver for driving a single coil motor, the motor driver includes: a bridge driver configured for applying a driving signal to the single coil by commuting a motor voltage (Vmot) or a motor current (Imot), supplied to the bridge driver, between terminals (OUT1, OUT2) of the single coil; a controller configured for controlling the commuting of the bridge driver and for setting a preferred value of the motor voltage in function of a preferred operating point; a first voltage regulator configured for regulating the motor voltage or the motor current to the preferred value.

15 Claims, 7 Drawing Sheets

(56) References Cited

U.S. PATENT DOCUMENTS

| | | |
|---|---|---|
| 2007/0047927 A1 | 3/2007 | Collins et al. |
| 2014/0062355 A1* | 3/2014 | Wang ................. H02P 6/14 |
| | | 318/400.04 |
| 2018/0138847 A1* | 5/2018 | Kaidu ................. H02P 6/16 |
| 2020/0280275 A1* | 9/2020 | Tanaka ............... H02P 29/68 |

* cited by examiner

ONE COIL MOTOR DRIVER WITH LINEAR CONTROL

FIELD OF THE INVENTION

The invention relates to the field of motor drivers. More specifically it relates to a motor driver configured for applying a driving signal to the single coil of a single coil motor, thereby commutating between the terminals of the single coil.

BACKGROUND OF THE INVENTION

A wide range of very low power fan applications are developing both in the automotive industry, as well as in the non-automotive industry. For instance, for supplying air quality sensor modules with a predefined airflow. The typical way to control these motors using pulse width modulation (PWM) control implies problems related to electromagnetic interference (EMI) or introduces limitations in terms of motor design (for instance a minimum coil inductance is required to ensure low noise operation) freedom.

There is therefore a need for motor drivers which are optimized for applying speed control without the need for PWM control.

SUMMARY OF THE INVENTION

It is an object of embodiments of the present invention to provide a good motor driver for driving a single coil motor.

The above objective is accomplished by a method and device according to the present invention.

In a first aspect embodiments of the present invention relate to a motor driver for driving a single coil motor. The motor driver comprises:
- a bridge driver configured for applying a driving signal to the single coil by commuting a motor voltage (Vmot), such that an induced motor current (Imot) changes direction in line with the rotor position, supplied to the bridge driver, between terminals (OUT1, OUT2) of the single coil (10),
- a controller configured for controlling the commuting of the bridge driver and for setting a preferred value of the motor voltage in function of a preferred operating point,
- a first voltage regulator configured for regulating the motor voltage, and thus the resulting motor current, to the preferred value.

It is an advantage of embodiments of the present invention that a device for speed control is provided without the need for PWM control. It is, moreover, an advantage of embodiments of the present invention that the controller of the motor driver itself is configured for setting the preferred motor voltage and that this is done in function of a preferred operating point. The preferred operation point may for example be a target speed or target torque or an open loop target operating point. An open loop target operating point may for example be the target equivalent motor voltage. This target equivalent motor voltage may be obtained as follows. When, in a prior art motor controller, a PWM input duty cycle is applied, this corresponds to a PWM output duty cycle (DCout) via a transfer curve. The equivalent motor voltage is then:

$$Vmot = DCout \ast VDD$$

wherein VDD is the power supply and DCout is the maximum PWM value during the EHP.

In embodiments of the present invention the motor voltage or motor current as well as the shape of the driving signal may be controlled by the controller in order to obtain a preferred operating point.

In a second aspect embodiments of the present invention relate to a motor system comprising a motor driver in accordance with embodiments of the present invention and comprising the single coil motor.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to the driving signal, reference is made to the signal which generates a current through single coil of the motor. The current may be generated by a voltage difference over the coil or a current source may apply a current through the single coil.

Where in embodiments of the present invention reference is made to an electrical half period (EHP), reference is made to a period of 180 electrical degrees, which is starting at the start of the rising slope of a driving signal and ends at the start of the rising slope of the next driving signal.

In a first aspect embodiments of the present invention relate to a motor driver 100. The motor driver 100 is configured for driving a single coil motor 10 and in a second aspect embodiments of the present invention relate to a motor system 200 comprising such a motor driver 100 and the single coil motor 10. Examples of such motor drivers are shown in FIG. 1 to FIG. 4. A motor driver 100, according to embodiments of the present invention, comprises:
- a bridge driver 110 configured for applying a driving signal to the single coil by commuting a motor voltage (Vmot), supplied to the bridge driver 110, between terminals (OUT1, OUT2) of the single coil 10.
- a controller 130 configured for controlling the commuting of the bridge driver 110 and for setting a preferred value of the motor voltage in function of a preferred operating point,
- a first voltage regulator 120 configured for regulating the motor voltage to the preferred value.

Controlling the commuting of the bridge drive may comprise wave shaping and timing.

In embodiments of the present invention the speed control may be open loop or closed loop. In case of open loop speed control, the preferred operating point may be a preferred motor voltage or motor current. In case of closed loop speed control, the preferred operating point may for example be a target speed or target torque. The preferred operating point may be defined by a minimum and a maximum motor speed.

A motor driver according to embodiments of the present invention can be used for driving a wide variety of motor coils. The time constant may for example range between 1 µs and 20 ms. Compared to PWM, it is an advantage of embodiments of the present invention that no negative (i.e., generator) current is generated even if the time constant of the single coil motor is smaller than 50 µs.

In embodiments of the present invention the first voltage regulator 120 may for example be a linear voltage regulator or a switched mode power supply. Such a switched mode power supply can be shielded for radiated emissions the motor would radiate from its laminated stack and coils, much more easily than the motor assembly. Also switched mode power supplies can be reduced in size by increasing their switching frequencies, which is not applicable for the motors.

In embodiments of the present invention the controller 130 adjusts the output voltage (i.e., the motor voltage) or the output current (i.e., the motor current) of the first voltage regulator to adjust the motor speed or torque.

The bridge driver 110 comprises transistors T12, and T11 connected in series between the first voltage regulator 120 and the ground. The interconnection between the two transistors is connected with the terminal OUT1 of the single coil. The bridge driver 110, moreover, comprises transistors T22, and T21 connected in series between the first voltage regulator and the ground. The interconnection between the two transistors is connected with the other terminal OUT2 of the single coil.

In embodiments of the present invention the controller 130 is configured for controlling a shape of the driving signal (e.g., a rising slope and a falling slope of the driving signal) by controlling the commuting of the bridge driver. Thus, soft switching is achieved. The bridge driver only needs to dissipate energy during soft switching. Such limited times of heating are alternated with the remaining of the EHP, such that the drivers can cool down in between the soft switching events.

In embodiments of the present invention the controller 130 may be configured for controlling the commuting and the first voltage regulator, for obtaining a driving signal with a specific shape. By doing so a sinewave shaped driving signal may be obtained.

In embodiments of the present invention a linear transition of the current from one direction to the other may be achieved by controlling the H-bridge driver. For instance, the falling slope may be realized by turning off T12 and/or T21 during a limited period of the EHP, followed by a rising slope realized by turning on T11 and/or T22 during a limited period of the EHP. In embodiments of the present invention the rising slope and/or the falling slope are set to a duration of a predefined percentage of the EHP (e.g., up to 1/16 of the EHP). Typically, the soft switching is in the range of 1/16 of the EHP. But even up to 1/4 soft switching, or even sinewave shaped, and triangular shaped switching allow sufficient time to cool down. Sinewave requires negligible dissipation during ~1/4 of the EHP, and this period can therefore be considered as a cooldown period. It is, furthermore, noted that for triangular shaped switching no significant cool down time is required. In embodiments of the present invention the slopes of the driving signal may for example be regulated between slopes with a predefined percentage of the EHP (e.g., 1/16 of EHP period) and sinewave, or for example between a flat driving signal and a driving signal with slopes with a predefined duration (e.g., 4/16 of the EHP period).

It is an advantage of embodiments of the present invention that energy through the coil can be controlled by regulating the slope.

In specific embodiments where sufficient cooling is available through wind cooling or applying heatsinks etc., the maximum motor voltage (Vmot) may be further reduced by keeping the H-bridge drivers in linear mode during the whole driving period.

It is an advantage of embodiments of the present invention that the controller is configured for controlling the commuting of the bridge driver, in combination with controlling the voltage of the first voltage regulator. Thus, the controller can, for example, control the speed by controlling the motor voltage and by controlling the rising and falling slope of the driving signal. For example, in case the output voltage of the first voltage regulator is also used for powering the control electronics of the motor driver (e.g., the controller and the sensors), this voltage should not decrease below a certain voltage threshold below which the control electronics are not operating. In case the motor speed should be decreased, it is advantageous that the controller can achieve this by controlling the rising and falling edge of the driving signal. Thus, at the minimum allowable motor voltage, it is still possible to decrease the motor speed by controlling the shape of the driving signal (e.g., the rising and falling edge, and the driving part and the flat time of the driving signal).

It is an advantage of embodiments of the present invention that the noise can be reduced by controlling the rising and falling slopes of the driving signal.

In embodiments of the present invention the controller is configured for controlling the commuting of the bridge driver such that the rising slope and/or the falling slope of the driving signal are piecewise linear slopes.

The first voltage regulator may adjust its output voltage or current based on a comparison by the controller of the actual motor speed with the requested target motor speed. This linear regulator may be developed in at least 1 stage. The simplest voltage regulator may for example consist of 1 transistor, of which the controller regulates the gate voltage to keep it in linear mode. In such a regulator the single transistor has to absorb all heat dissipation.

An alternative voltage regulator may for example comprise a series of 2 transistor stages which each take part of the voltage drop, to spread the heat dissipation physically over a larger area, or even physically over 2 packages.

In embodiments of the present invention the first voltage regulator may be integrated in an IC.

In embodiments of the present invention there may be more than one first voltage regulator. For example, one for 5V operation, and an optional voltage regulator to use at 12V.

The first voltage regulator may also be realized as 2 regulators in series. One linear voltage regulator which is directly connected to the supply voltage (e.g., battery voltage in automotive applications), and limits its output voltage to an intermediate voltage Vinterm (e.g., approximately 9V, which is the minimum operating voltage typically required for automotive applications). The output voltage of the first regulator is then fed into another linear voltage regulator which regulates the motor voltage (Vmot) between the intermediate voltage and a predefined lower voltage. The predefined lower voltage may for example be 1.8V. In the example of a clamped voltage of 9V and a lower voltage of 1.8V, the dynamic range which can be achieved by regulating the motor voltage Vmot is 1.8/9V=20%, which is sufficient for the majority of the applications.

This motor voltage Vmot is supplied to the bridge driver and possibly also as an internal supply voltage to the driver electronics (e.g., analog and digital blocks). In that case the driver electronics should be designed to operate in a range from the clamped voltage (e.g., 9V) to the lower voltage (e.g., 1.8V).

Applications where the dynamic range is limited, for instance to only compensate for temperature drift, and production tolerances in the motor production, may only require a reduced dynamic range. For example, the dynamic range may be reduced to 50% of a dynamic range between 9V and 1.8V. For example, a first voltage regulator which can operate from 5.0 V to 2.5 V may be used.

The motor driver may comprise one or more one or more second voltage regulator(s) 140 configured to provide an internal supply voltage (Vint). The internal supply voltage Vint may for example be used for powering the controller and other low voltage electronics such as the analog and digital blocks such as the controller and for example a position sensor with a stable supply voltage. There may be different dedicated voltage regulators. There may for example be a dedicated voltage regulator for the digital at 1.8V, and a dedicated voltage regulator for the position sensor at 3.3V, and a dedicated voltage regulator for IO communication at 5V, etc. There may for example even be two voltage regulators of 3.3V.

Control of the motor voltage may be combined with soft switching. Thus, the dynamic range can be increased. The motor voltage Vmot set by the first voltage regulator may for example range between a minimum and a maximum voltage. When the maximum voltage is applied, the duration of the rising and falling slope of the driving signal may be limited to a first predefined duration in function of the EHP (for example 1/64 of the EHP). The slope may be gradually increased with decreasing motor voltage Vmot. At the minimum voltage the duration of the rising and falling slope of the driving signal may have increased a second predefined duration in function of the EHP (for example 1/4 of the EHP).

To reduce the acoustic noise, first the motor voltage may be regulated such that the target operating point can be achieved with a low noise switching method (for instance sine) until the first voltage regulator (e.g., a linear voltage regulator) is at its limits. It may for example have reached a minimum or maximum possible regulation range of the motor voltage. Next, the switching method may be adjusted to regulate closer to the operating point (e.g., by shifting from a sine wave shaped driving signal towards a flat driving signal to increase the speed or motor voltage, and vice versa to reduce the speed or motor voltage. Optionally the rising slope may be adjusted at a different slope compared to the falling slope. The reason therefore being that the rising slope causes less acoustic noise than the falling slope. The slopes may for example be regulated such that the rising slope is steeper than the falling slope.

In a second aspect embodiments of the present invention relate to a motor system 200 comprising a motor driver 100 according to embodiments of the present invention and comprising a single coil motor 10. The motor driver 100 is configured for driving the single coil motor 10. The time constant of the single coil motor may for example range between 1 µs and 20 ms. The motor system may for example be a motor system for a pump or a fan.

Figure 1:
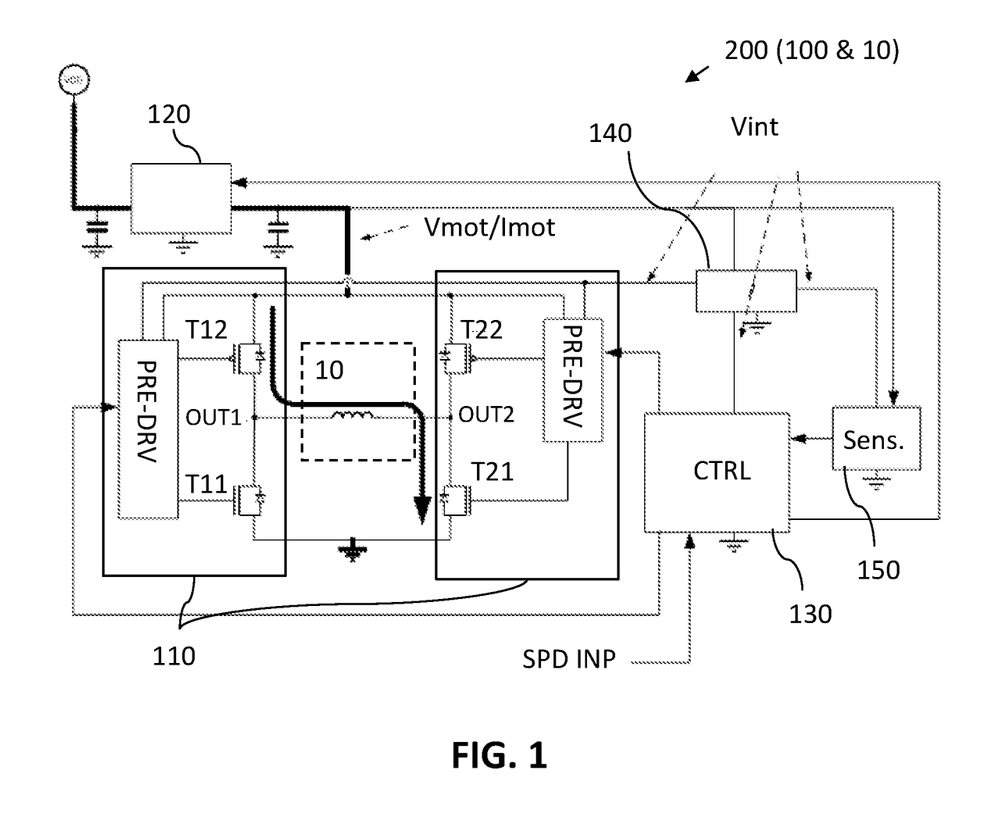
FIG. 1 shows a block diagram of a motor driver and of a motor system in accordance with embodiments of the present invention wherein the first voltage regulator is used for powering the second voltage regulator.

FIG. 1 shows a block diagram of a motor driver 100 and of a motor system 200 comprising such a motor driver 100 and a single coil motor 10, in accordance with embodiments of the present invention. In this example the input for the second voltage regulator 140 is the first voltage regulator 120. In this exemplary embodiment of the present invention these regulators are linear voltage regulators. The controller 130 controls the first voltage regulator to adjust the motor voltage Vmot such as to adjust the motor operation to a preferred operating point (e.g., to adjust the motor actual speed to a target speed). In embodiments of the present invention the control input to set the preferred operating point may be an external PWM input, an analog input, for instance by rotating a knob of a potentiometer or by soldering an external resistor, or the preferred operating point may also be set in internal memory (e.g., OTP, EEPROM). For example, a target voltage, a target speed or target speed range, target torque or target torque range may be set using the control input. A motor driver for which the operating point is a target torque may for example be applied in pumps.

In embodiments of the present invention a temperature sensor may be configured for measuring the temperature of the first voltage regulator. When the temperature increases to a maximum limit of the first voltage regulator, the controller may be configured for changing the shape of the driving signal for instance by moving from a duration of the rising and falling slope (e.g. 1/16$^{th}$ of the EHP) towards sinewave, or even from sinewave to triangular such as to reach the target operating point with a higher motor voltage Vmot from the first regulator.

In embodiments of the present invention a temperature sensor (which may or may not be different from the previous temperature sensor) may be connected with the controller 130 wherein the controller is configured to reduce the dissipation in the driver, such as to avoid overheating of the bridge driver. The dissipation of the driver may for instance be reduced by adapting the shape of the driving signal (e.g., the soft switching from triangular, towards slopes with a duration of 1/16 of the EHP, or even towards no soft switching). This may be done in function of the temperature, for example when a critical temperature is measured by the temperature sensor. This may imply that the preferred operation point is not completely obtained.

In embodiments of the present invention the controller may be configured for regulating to a preferred operating point (by setting the preferred value and by changing the shape of the driving signal) such that the preferred operation point is obtained or such that the preferred operation point is reached as close as possible, without overheating the bridge driver and/or the regulator. In an extreme case the controller may also decide to switch off the bridge driver entirely and enter into an overtemperature shutdown, if overheating still occurs at a minimum operating point.

The temperature sensor may, for example, monitor the driver temperature.

The temperature sensor(s) may for example be junction temperature sensor(s).

The motor driver may also comprise a position sensor. The output of the position sensor being connected with an input of the controller to pass the position information to the controller. The rotor position may be used for controlling the commuting of the bridge driver. The controller may calculate an actual rotor speed from the incoming rotor positions.

Any analog signals may be digitized by an AD converter before being processed by the controller.

In embodiments of the present invention the motor driver comprises a voltage sensor configured for monitoring the motor voltage or a current sensor configured for measuring the motor current.

The voltage sensor may for example serve to measure the motor voltage, and regulate the motor voltage to a target motor voltage. The controller 130 may, moreover, be configured for switching off the bridge driver when the motor voltage exceeds an overvoltage condition or when the motor current exceeds an overcurrent condition. The controller may also be configured to calculate/extrapolate conditions with excessive heat dissipation from current, voltage and speed information, such as to avoid the need for dedicated temperature sensor inputs.

Figure 2:
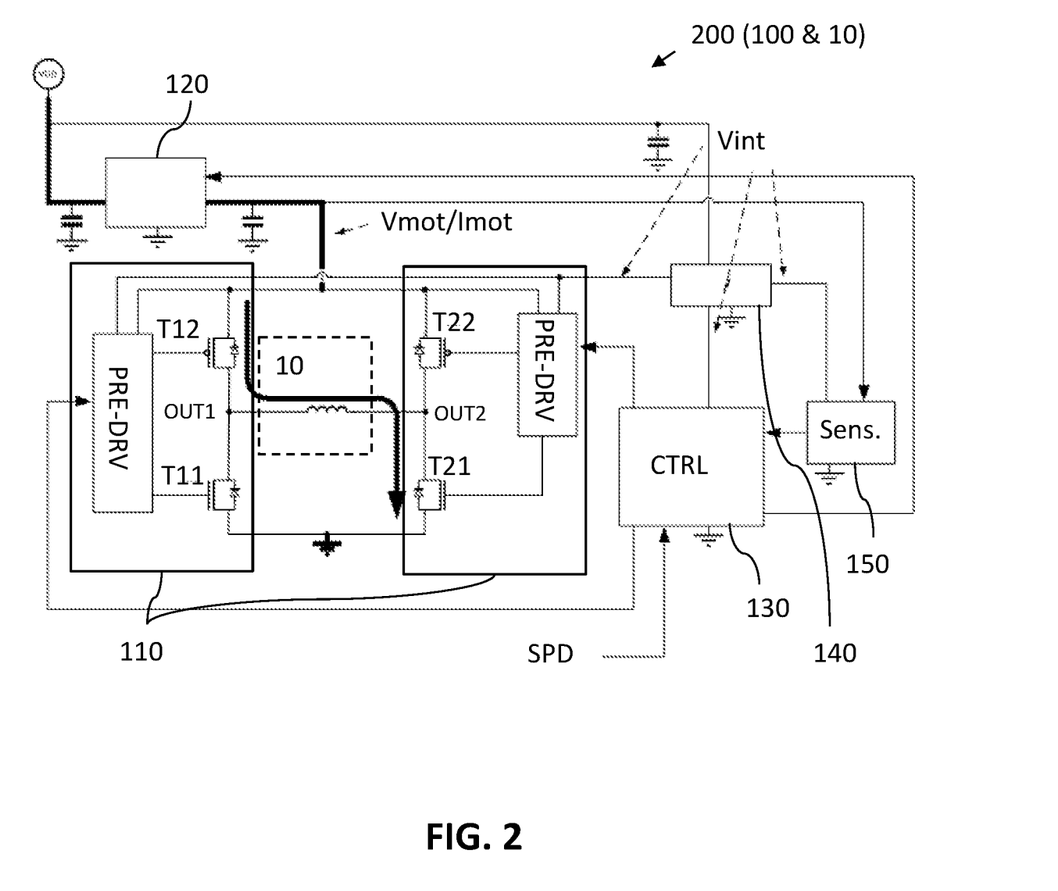
FIG. 2 shows a block diagram of a motor driver and of a motor system in accordance with embodiments of the present invention which is configured such that the first voltage regulator and the second voltage regulator can be powered by an external power supply.

In the exemplary embodiment illustrated in FIG. 2 the first voltage regulator 120 and the second voltage regulator 140 are both powered by an external power supply. The motor driver may therefore comprise one or more external pins to which a power supply VDD can be connected, and which are internally connected with the first and second voltage regulator.

The motor driver 100 may be implemented in one or more chips. In the exemplary embodiment illustrated in FIG. 3 a two chip implementation is shown. In this example the first voltage regulator 120 (e.g., a linear voltage regulator) is realized as a first integrated circuit (IC). The H-bridge driver 110, the second voltage regulator 140, the controller 130, the sensors 150 (e.g., temperature sensor, position sensor), and a speed setting input are implemented as a second integrated circuit. In this example the target speed can be set with an external resistor on a SPDSET pin. In this example the controller can decide to operate in a degraded mode (e.g., without reaching the target speed or without sustaining the target noise level) when a critical temperature has been detected by the junction temperature sensor (Tj). The first voltage regulator 120 supplies regulated power through interface pin VMOT to the second IC. The controller may adjust the first voltage regulator 120 based on the difference between the actual speed (from the position sensor) and the target speed.

Figure 3:
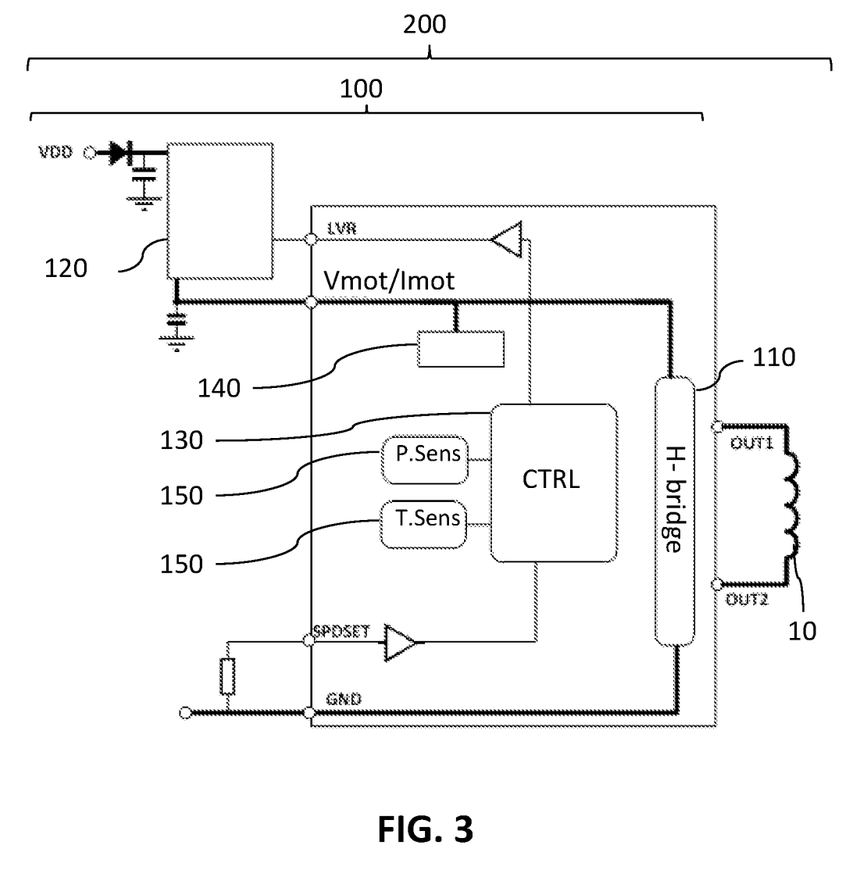
FIG. 3 shows a block diagram of a two chip implementation of a motor driver in accordance with embodiments of the present invention.

In preferred implementations both IC's are realized as exposed pad packages, and are mounted on the same printed circuit board (PCB). As such the junction temperature sensor in the second IC will also indirectly monitor the temperature of the first voltage regulator 120.

However, it is a benefit of such two IC solutions if they are realized in two different packages that they can be put remote from each other, and therefore minimize the cross heating between both ICs, which allows maximum dissipation and thus regulation range.

In preferred implementations for a two IC solution, a dedicated external sensor may be applied to provide the controller access to the junction temperature of the first voltage regulator.

Figure 4:
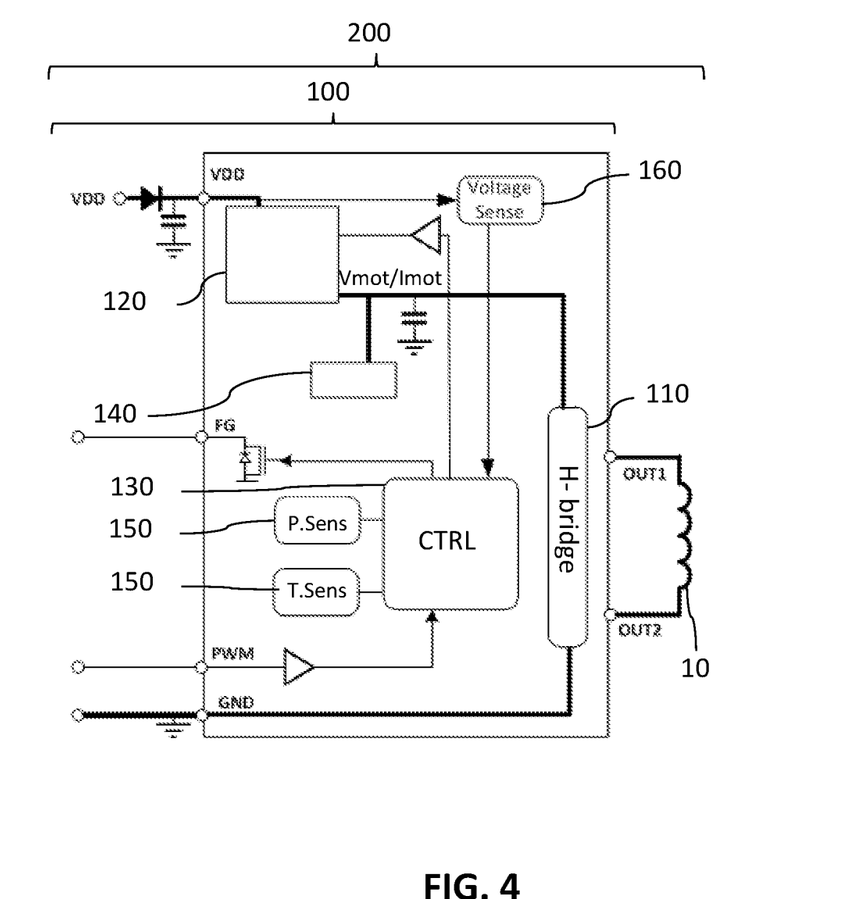
FIG. 4 shows a block diagram of a motor driver implemented in a single integrated solution, in accordance with embodiments of the present invention.

FIG. 4 shows an implementation example of a motor driver 100 implemented in a single integrated solution, in accordance with embodiments of the present invention. Such a solution can for example be two ICs in a single package construction, or a single IC.

The power regulating range of such integrated solution will be inferior than a multi die solution, because all dissipation is concentrated into one package. However, integration allows more interconnections and simplifies the overall design, and/or allows more advanced implementations.

In this implementation example the speed input is provided through a PWM input. The motor driver 100 comprises a voltage sensor 160 which monitors the supply voltage VDD and provides additional information on the supply voltage to the controller to regulate, monitor and protect the full implementation. The controller 130 may decide to switch off the driver 110 when VDD exceeds an overvoltage condition.

Figure 5:
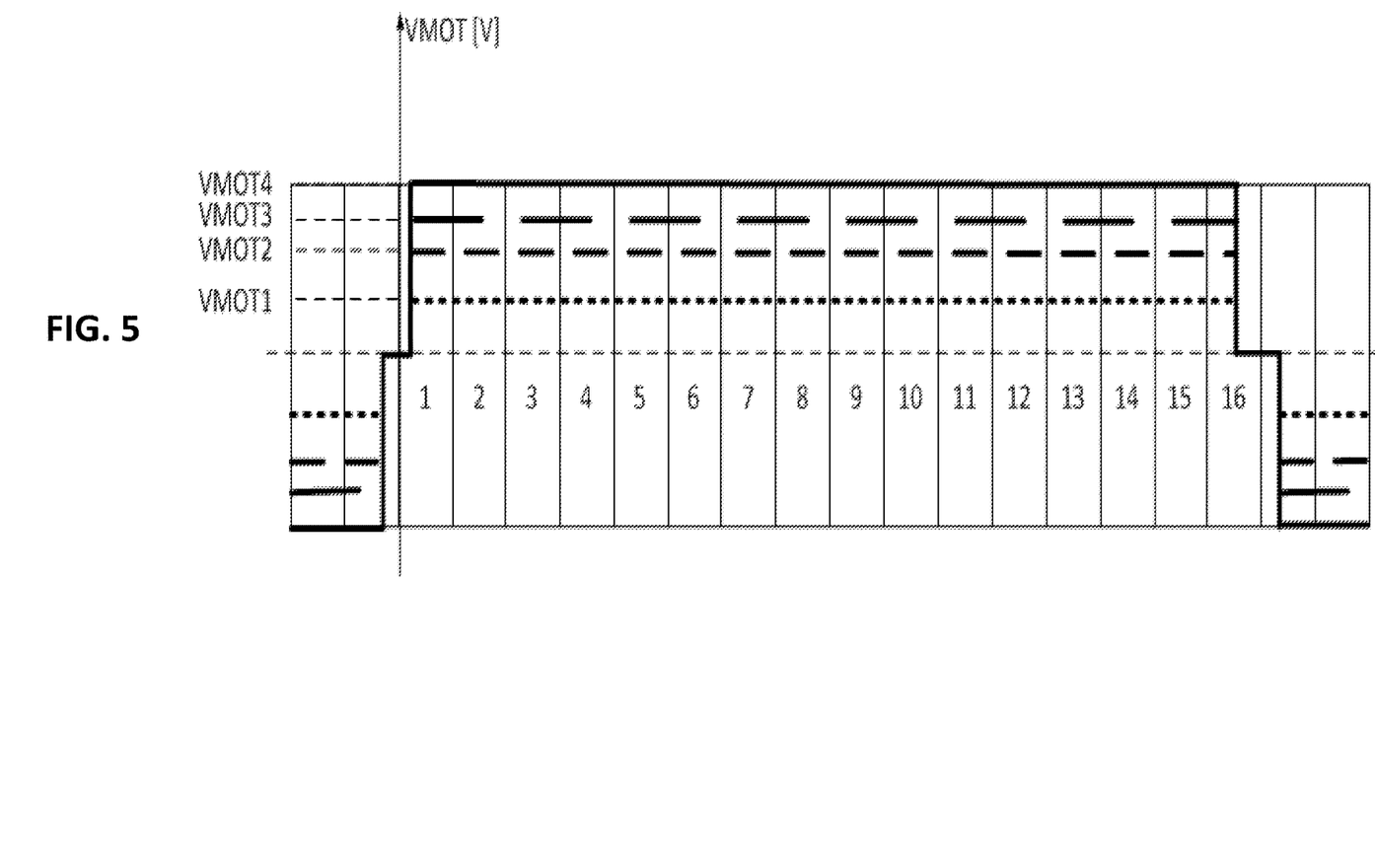
FIG. 5 shows the motor voltage for one EHP, without soft switching, obtained by a motor driver in accordance with embodiments of the present invention.

FIG. 5 shows the motor voltage VMOT for one EHP obtained by a motor driver 100 in accordance with embodiments of the present invention. In this example the resulting motor voltage shape for one EHP without soft switching by the H-Bridge driver is shown.

The H-bridge is switching hard the direction of the motor current at the commutation point. A short "Flat period" may be applied during which the motor current can recirculate in the coil. This is illustrated by the horizontal parts in the rising and falling slope. This minimizes the total dissipation. This can also be a fall back control method in case the overall system is running too hot, and the soft switching is disabled.

In this case the LVR1 adjusts the motor voltage (VMOT) in order to achieve the target speed. Four different levels of VMOT are shown (VMOT1, VMOT2, VMOT3, VMOT4).

Figure 6:
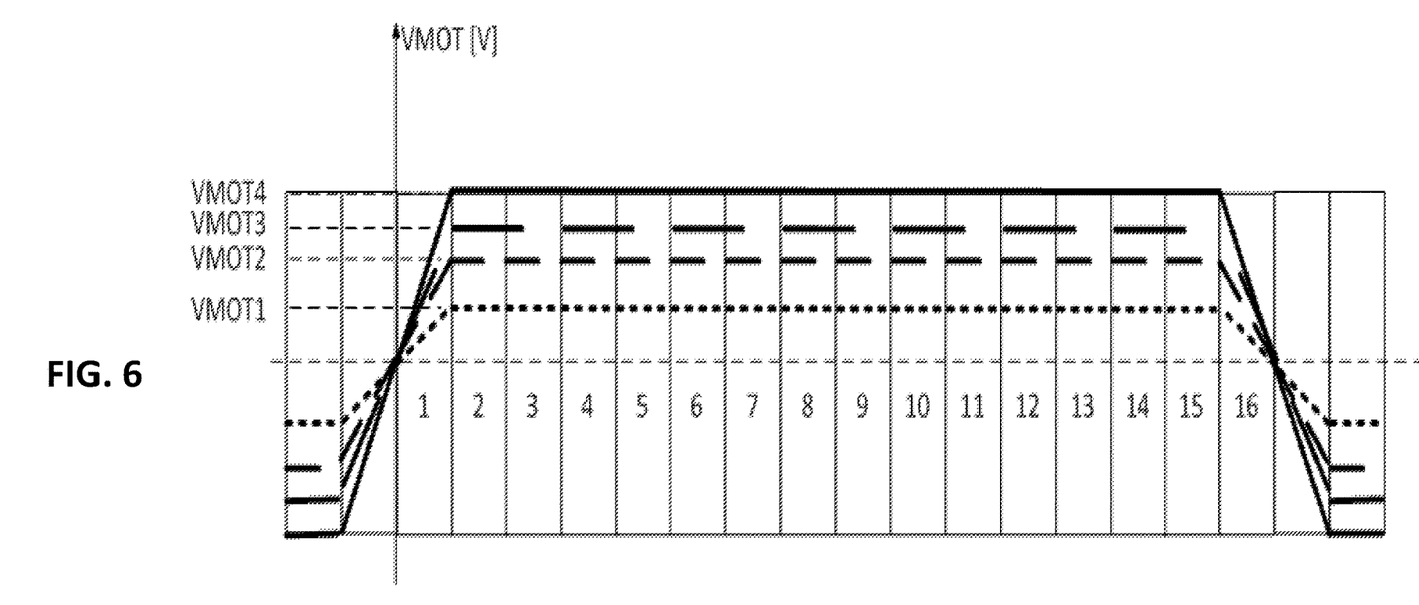
FIG. 6 shows the motor voltage for one EHP, with soft switching, obtained by a motor driver in accordance with embodiments of the present invention.

FIG. 6 shows the motor voltage VMOT for one EHP obtained by a motor driver 100 in accordance with embodiments of the present invention. This motor voltage shape shows that next to the adjustment of the VMOT by the first voltage regulator 120, additionally linear switching is implemented in the H-bridge driver to realize the soft switching of the current at the commutation points. In this example implementation each EHP is subdivided in 16 equal segments. Based on input from the position sensor the controller 130 will realize the linear transition of the current from one direction to the other in 2*1/16 of the EHP by controlling the H-bridge driver. The falling slope may for example be realized by turning off T12 and T21 during 1/16 of the EHP, followed by a rising slope realized by turning on T11 and T2 during 1/16 of the EHP.

Figure 7:
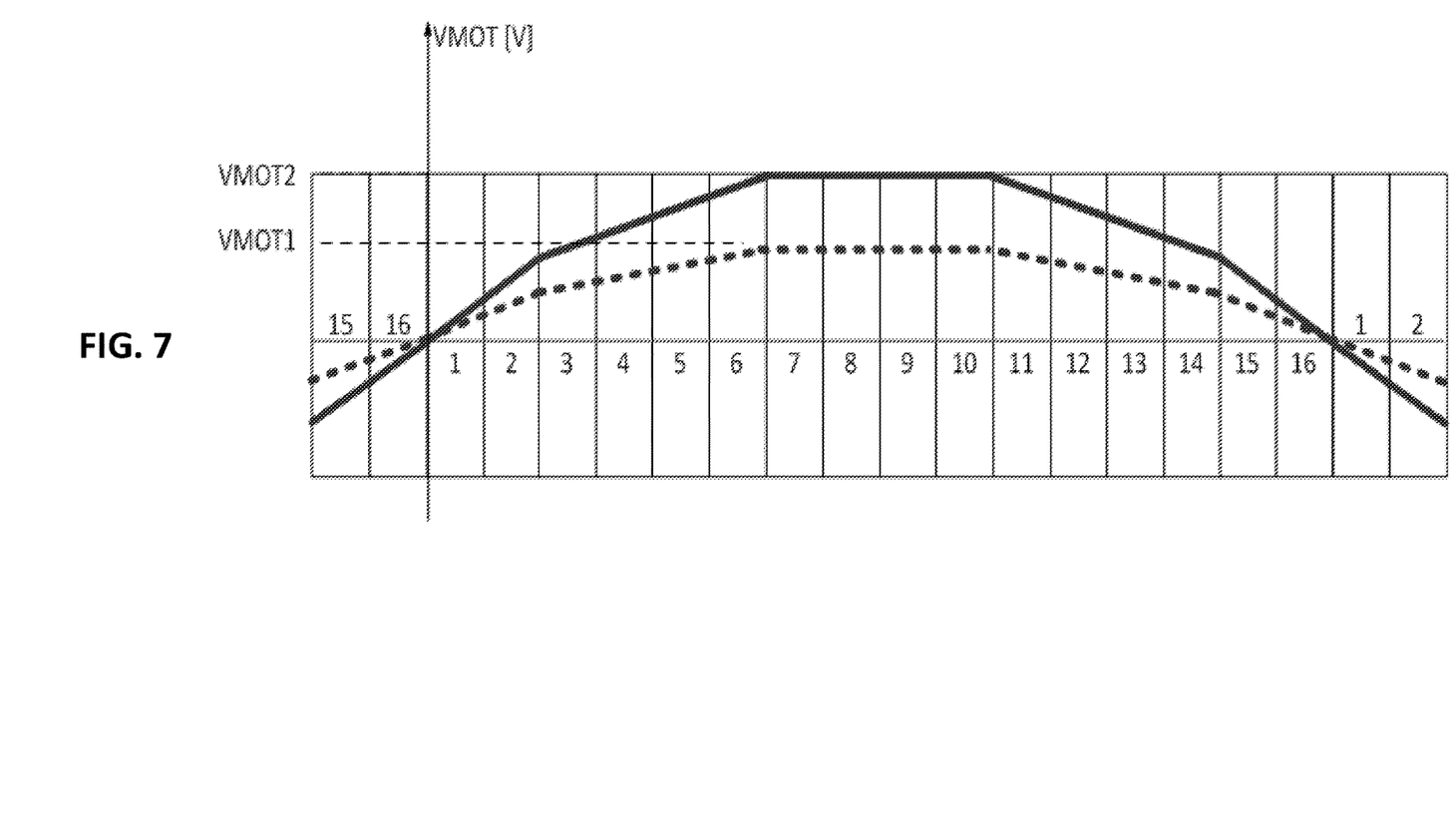
FIG. 7 shows the motor voltage for one EHP, with a sine wave shape, obtained by a motor driver in accordance with embodiments of the present invention.

FIG. 7 shows the motor voltage VMOT obtained by a motor driver 100 in accordance with embodiments of the present invention for one EHP. In this example the motor voltage is approximating a sinewave shape. In this case the H-bridge driver is dissipating during 3/4 of an EHP. An actual sinewave will be continuously dissipating in the H-bridge driver. The shape of the driving signal may be a piece wise approximation of a sine wave or it may be a true sinusoidal shape.

Beyond sinewave the torque may be further reduced by further increasing the slope to a straight slope with a duration of for instance 8/16 of the EHP rising and 8/16 falling, or 6/16 rising and 10/16 falling.

In exemplary embodiments of the present invention, optionally the H-bridge drivers may remain in linear mode during the driving section between the rising slope and the falling slope, to complement the linear regulating capability of the first voltage regulator.

In another exemplary embodiment of the present invention a flat period may be introduced between the falling slope and the rising slope, and some lead angle between the voltage over the coil and the current through the coil may be applied.

Throughout the description different embodiments are given wherein the regulator is a linear voltage regulator. It is clear for the skilled person that instead of a linear voltage regulator, also a switched mode voltage regulator, mutatis mutandis, can be used in these embodiments.

The invention claimed is:

1. A motor driver for driving a single coil motor, the motor driver comprising:
   a bridge driver configured for applying a driving signal to the single coil by commuting a motor voltage (Vmot), supplied to the bridge driver, between terminals (OUT1, OUT2) of the single coil,
   a controller configured for controlling the commuting of the bridge driver and for setting a preferred value of the motor voltage in function of a preferred operating point wherein the controlling is done such that no negative current is generated in the motor coil, and
   a first voltage regulator configured for regulating the motor voltage to the preferred value wherein the first voltage regulator is a linear voltage regulator.

2. The motor driver according to claim 1, wherein the controller is configured for controlling a rising slope and a falling slope of the driving signal by controlling the commuting of the bridge driver.

3. The motor driver according to claim 2, wherein the controller is configured for controlling the commuting of the bridge driver such that the rising slope and/or the falling slope of the driving signal are piecewise linear slopes.

4. The motor driver according to claim 2, wherein the rising slope and/or the falling slope are set to a duration of up to a predefined percentage of an electrical half period.

5. The motor driver according to claim 1, wherein the controller is configured for controlling the commuting and the first voltage regulator, for obtaining a shape of the driving signal.

6. The motor driver according to claim 5, wherein the controller is configured for obtaining a sinewave shaped driving signal.

7. The motor driver according to claim 1, wherein the preferred operating point is defined by a minimum and a maximum motor speed.

8. The motor driver according to claim 1, wherein the preferred operating point is a target speed or a target torque or an open loop target operating point.

9. The motor driver according to claim 1, comprising a position sensor connected with the controller, wherein the position sensor transmits a rotor position of the motor to the controller and wherein the controller uses the rotor position for controlling the commuting of the bridge driver.

10. The motor driver according to claim 9, wherein the controller is configured for determining an actual rotor speed from the rotor positions received from the position sensor, and for adjusting the preferred voltage to regulate the actual rotor speed to a target rotor speed.

11. The motor driver according to claim 1, comprising a temperature sensor connected with the controller, wherein the controller is configured to reduce dissipation in the bridge driver when a critical temperature is measured by the temperature sensor.

12. The motor driver according to claim 1, comprising a voltage sensor configured for monitoring the motor voltage or a current sensor configured for measuring the motor current, wherein the controller is configured for switching off the bridge driver when the motor voltage exceeds an overvoltage condition or when the motor current exceeds an overcurrent condition.

13. The motor driver according to claim 1, moreover, comprising a second voltage regulator configured to provide an internal supply voltage (Vint).

14. The motor driver according to claim 1, wherein the bridge driver and the first voltage regulator are integrated in the same package.

15. The motor system comprising a motor driver according to claim 1, and the single coil motor, wherein the motor driver is configured for driving the single coil motor.

* * * * *